US009811699B2

(12) United States Patent
LeBlanc et al.

(10) Patent No.: US 9,811,699 B2
(45) Date of Patent: Nov. 7, 2017

(54) MASTER TRACKING DEVICE

(71) Applicant: Schlumberger Technology Corporation, Sugar Land, TX (US)

(72) Inventors: Graham LeBlanc, Richmond, TX (US); Arturo Altamirano, Stafford, TX (US); Dinh Quy Nguyen, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 14/713,297

(22) Filed: May 15, 2015

(65) Prior Publication Data

US 2016/0335465 A1    Nov. 17, 2016

(51) Int. Cl.
| | |
|---|---|
| *G06K 7/10* | (2006.01) |
| *H04L 12/28* | (2006.01) |
| *H04W 4/00* | (2009.01) |
| *H04L 12/24* | (2006.01) |
| *G06Q 10/08* | (2012.01) |

(52) U.S. Cl.
CPC ....... *G06K 7/10366* (2013.01); *G06Q 10/087* (2013.01); *H04L 12/2854* (2013.01); *G06Q 10/08* (2013.01); *H04L 41/12* (2013.01); *H04W 4/008* (2013.01)

(58) Field of Classification Search
CPC .. C07D 263/58; C07D 265/36; C07D 413/04; H04L 41/12; H04L 12/2854; H04W 12/06; H04W 4/008; H04W 4/04; G01S 5/0027; G01S 5/0294; G01S 5/06; H04M 1/72572; G08B 13/14; G08B 1/08; G06K 7/10366

USPC ............... 340/10.1, 572.1, 5.2, 5.7; 342/463
See application file for complete search history.

(56) References Cited

U.S. PATENT DOCUMENTS

| | | | |
|---|---|---|---|
| 6,967,589 B1 | 11/2005 | Peters | |
| 7,006,009 B2 | 2/2006 | Newman | |
| 7,096,092 B1 | 8/2006 | Ramakrishnan et al. | |
| 7,315,281 B2 * | 1/2008 | Dejanovic | C07D 263/58 342/457 |

(Continued)

FOREIGN PATENT DOCUMENTS

| | | |
|---|---|---|
| AU | 2004242120 B2 | 5/2010 |
| CA | 2081908 C | 7/2002 |

(Continued)

OTHER PUBLICATIONS

International Search Report and Written Opinion issued in International Patent Application No. PCT/US2016/030492 on Aug. 4, 2016; 13 pages.

*Primary Examiner* — Ali Neyzari
(74) *Attorney, Agent, or Firm* — Michael L. Flynn; Rachel E. Greene; Robin Nava

(57) ABSTRACT

A master tracking device, including a first transceiver for a local area network (LAN) configured to acquire a tag information from a plurality of radio frequency identification (RFID) tags; a global positioning system (GPS) receiver configured to acquire a location information; a microcontroller; a time base; and a second transceiver for a wide area network (WAN) configured to transmit a time stamp and the acquired information to a server. In other aspects, a method of tracking asserts using a master tracking device and a non-transitory computer readable medium are provided.

20 Claims, 6 Drawing Sheets

(56) References Cited

U.S. PATENT DOCUMENTS

| | | | |
|---|---|---|---|
| 7,450,627 B2 | 11/2008 | Couch et al. | |
| 7,558,564 B2 | 7/2009 | Wesby | |
| 7,603,296 B2 | 10/2009 | Whiteley et al. | |
| 7,605,696 B2 * | 10/2009 | Quatro | G06Q 10/08 340/539.13 |
| 7,657,468 B1 | 2/2010 | Whiteley et al. | |
| 7,664,685 B1 | 2/2010 | Whiteley et al. | |
| 7,707,076 B1 | 4/2010 | Whiteley et al. | |
| 8,091,775 B2 | 1/2012 | Zierolf | |
| 8,120,497 B2 | 2/2012 | Binmore | |
| 8,154,419 B2 | 4/2012 | Daussin et al. | |
| 8,311,581 B2 | 11/2012 | Nasr | |
| 8,352,049 B2 | 1/2013 | Hsiung et al. | |
| 8,397,810 B2 | 3/2013 | Verret et al. | |
| 8,528,817 B2 | 9/2013 | Snyder et al. | |
| 8,599,028 B2 | 12/2013 | MacLean, III et al. | |
| 2007/0124077 A1 | 5/2007 | Hedlund, Jr. | |
| 2007/0252696 A1 | 11/2007 | Belisle et al. | |
| 2008/0030345 A1 | 2/2008 | Austin et al. | |
| 2008/0068170 A1 | 3/2008 | Ehrman et al. | |
| 2010/0228428 A1 * | 9/2010 | Harshbarger | G07C 5/008 701/31.4 |
| 2011/0052423 A1 | 3/2011 | Gambier et al. | |
| 2011/0102177 A1 | 5/2011 | Johnson | |
| 2011/0241874 A1 | 10/2011 | Ghisani | |
| 2012/0203507 A1 | 8/2012 | Thomeer et al. | |
| 2012/0273191 A1 | 11/2012 | Schmidt et al. | |
| 2016/0127874 A1 * | 5/2016 | Kingsmill | H04W 4/04 455/456.1 |
| 2016/0238692 A1 * | 8/2016 | Hill | G01S 5/0294 |

FOREIGN PATENT DOCUMENTS

| | | |
|---|---|---|
| CA | 2433314 C | 3/2007 |
| CA | 2553448 C | 1/2011 |
| GB | 2462047 B | 8/2012 |
| WO | 8103698 | 12/1981 |
| WO | 2006060729 A2 | 6/2006 |
| WO | 2011046631 A1 | 4/2011 |
| WO | 2011082066 A | 7/2011 |

* cited by examiner

| Queue | Event | Message Types | HPM Generated | HPM Sent | LPM Generated | LPM Sent | Allowed Channels |
|---|---|---|---|---|---|---|---|
| OTA | OTA Update | checkupdates fw_test etc | | | | | Eth > Cell |
| HPQ | Daily update | Daily Update GPS | 24 hrs | immediate | 24 hrs | Next wake cycle | |
| | System status change | GPS + Status | 12 hrs | immediate | 12 hrs | 30 mins slots | Eth > Cell > Sat |
| | Minimum child reporting | Mesh/RFID msg | EXT power change 24 hrs/child | | EXT power change — | | |
| | Alarms | GPS + Alarm | 24 hrs/source | | 24 hrs/source | | |
| MPQ | Child detections | Mesh/RFID msg | 1 hr/child | immediate | All other triggers | 30 mins slots | Eth > Cell |
| | System status change | GPS + Status | All other triggers | | 30 mins & > 1 km | | |
| | Breadcrumb | Breadcrumb GPS | > 1 km | | 1 hr/source | | |
| LPQ | Alarms | GPS + Alarm | 1 hr/source | immediate | 30 mins | — | Eth > Cell |
| | RA Inventory messages | RA source msg | 30 mins | | 2 mins | | |
| | ECM messages | ECM data msg | 2 mins | | | | |

FIG. 3

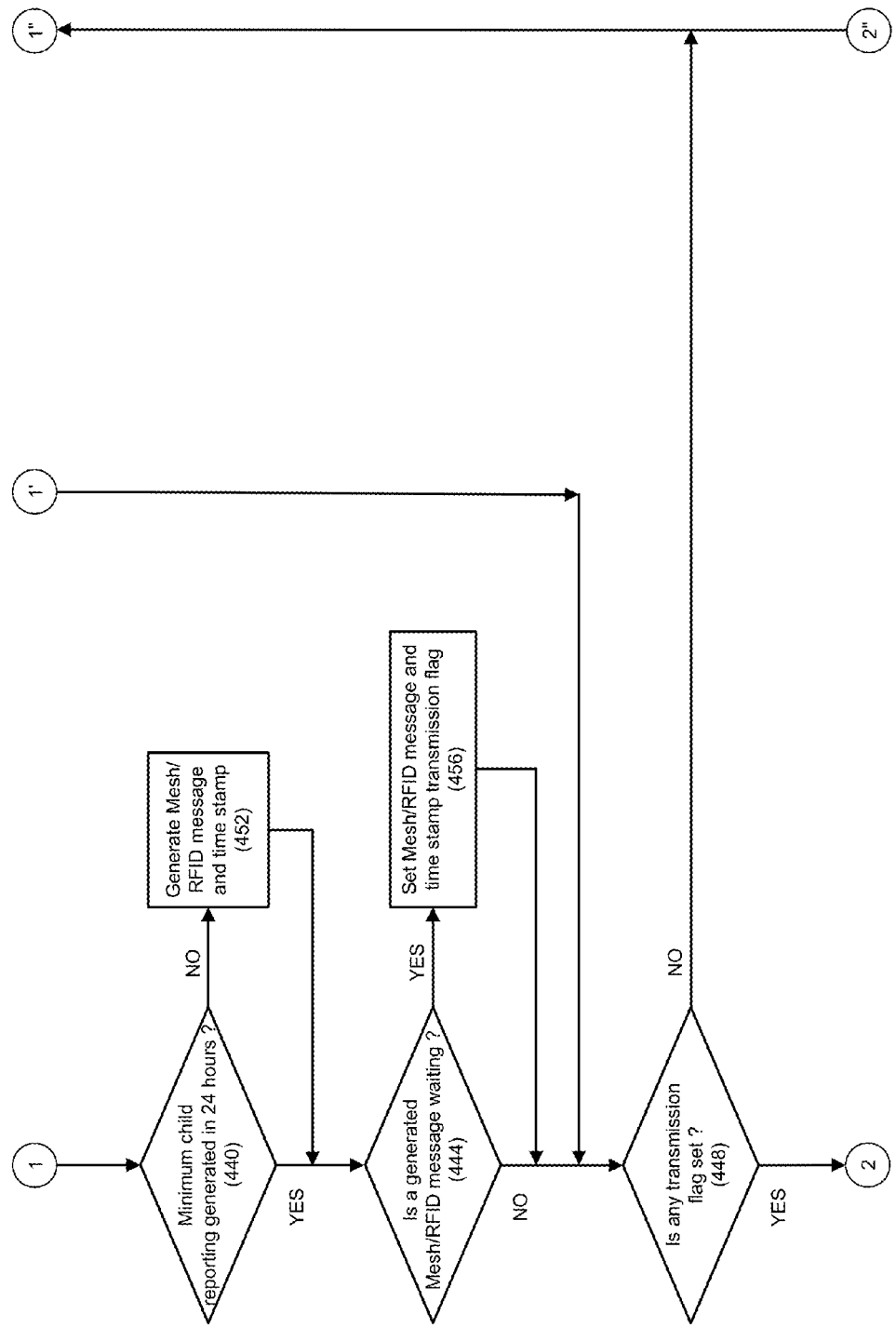

MASTER TRACKING DEVICE

BACKGROUND

Inventory management and asset tracking are relevant to businesses and organizations for many reasons. For example, a university may attach a barcode or an identifier to computing equipment, furniture, etc. to identify the equipment as the university's property. At the same time, the university may take a record of the barcode or the identifier and of the department in which the equipment resides. Then, in regular time intervals, the university may do an inventory of the equipment to ensure that the equipment is still available and in service.

Further, a retail business may attach a barcode or an identifier to the goods for sale. In addition, the retail business could keep a computerized record of all goods in the store with corresponding identifiers. When a product is sold, the identifier or barcode is scanned and subtracted from the computerized record. Advantageously, the ordering department could receive notifications when the inventory for a particular item is low and can thus procure the needed goods in a timely fashion. Once the particular item has been procured, it could receive a barcode or another identifier as well and could be entered into the computerized record where it replenishes the inventory of the item.

In addition, a hospital or national research laboratory may keep inventory of specialized research or treatment equipment, e.g., radioactive sources. All of these businesses and organizations may use inventory management for many purposes. In some cases, inventory management ensures that equipment does not get stolen or that equipment is still functional. In other cases, automated inventory management reduces the time spent to take an accurate count of the inventory. In yet other cases, inventory management is used for security purposes.

While inventory management relates to accurate accounting of the number of equipment, asset tracking is directed toward providing location information for each equipment in addition to the accounting information. In that regard, a retail business may ensure that the goods that have not been purchased yet do not leave the premises of the retail business. On the other hand, hospitals or the national research laboratories may track the inventory of specialized equipment to ensure that the whereabouts of such inventory is known at all times. Yet further, businesses related to construction, telecommunication, natural resource exploration, etc. may have a need for inventory management and tracking of mobile assets in the field.

SUMMARY

In general, in one aspect, one or more embodiments disclosed herein relate to a master tracking device, including a first transceiver for a local area network (LAN) configured to acquire a tag information from a plurality of radio frequency identification (RFID) tags; a global positioning system (GPS) receiver configured to acquire a location information; a microcontroller; a time base; and a second transceiver for a wide area network (WAN) configured to transmit a time stamp and the acquired information to a server.

In one aspect, one or more embodiments disclosed herein relate to a method of tracking assets using a master tracking device, including: acquiring tag information from a plurality of radio frequency identification (RFID) tags in a local area network (LAN); acquiring a location information from a global positioning system (GPS) receiver; and transmitting a time stamp and the acquired information to a server in a wide area network (WAN).

In another aspect, one or more embodiments disclosed herein relate to a non-transitory computer readable medium comprising instructions which, when executed by a processor, cause the processor to: acquire tag information from a plurality of radio frequency identification (RFID) tags in a local area network (LAN); acquire a location information from a global positioning system (GPS) receiver; and transmit a time stamp and the acquired information to a server in a wide area network (WAN).

Other aspects of the disclosure will be apparent from the following description and the appended claims.

BRIEF DESCRIPTION OF DRAWINGS

FIG. 3 shows an event and message queuing table in accordance with one or more embodiments.

FIGS. 4a, 4b, and 4c show a method flowchart in accordance with one or more embodiments.

DETAILED DESCRIPTION

Figure 1:
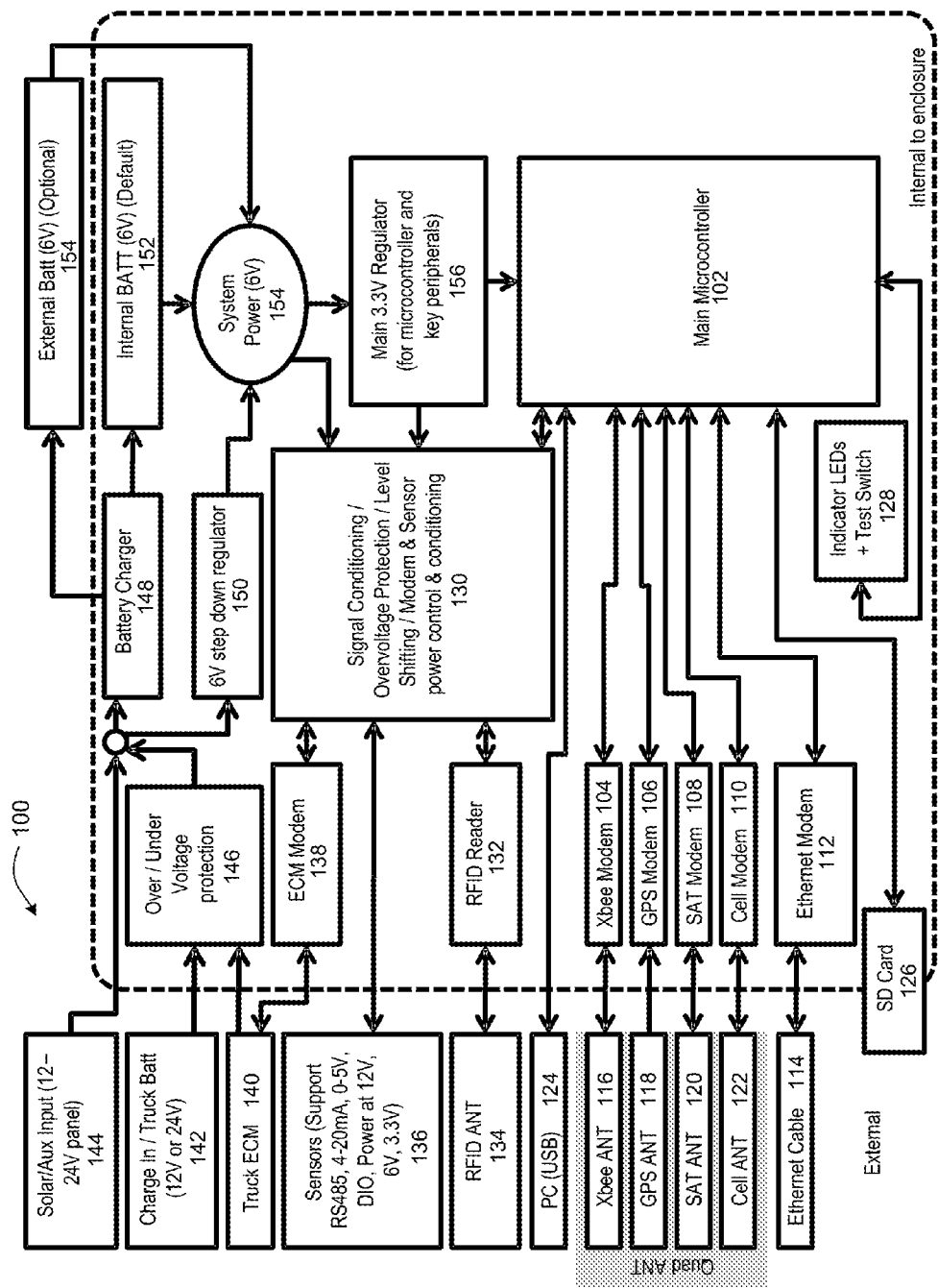
FIG. 1 shows a hardware block diagram of a master tracking device in accordance with one or more embodiments.

Specific embodiments will now be described in detail with reference to accompanying figures. Like elements in the various figures may be denoted by like names and/or like reference numerals for consistency.

In the following detailed description of embodiments of the disclosure, numerous specific details are set forth in order to provide a more thorough understanding of the disclosure. However, it will be apparent to one of ordinary skills in the art that embodiments may be practiced without these specific details. In other instances, well-known features have not been described in detail to avoid unnecessarily complicating the description.

Throughout the application, ordinal numbers (e.g., first, second, third, etc.) may be used as adjectives for elements (i.e., any noun in the application). The use of ordinal numbers is not to imply or to create a particular ordering of the elements nor to limit any element to being only a single element unless expressly disclosed, such as by the use of the terms "before," "after," "single," and other such terminology. Rather, the use of ordinal numbers is to distinguish the elements. For example, the first element is distinct from the second element, and the first element may encompass more than one element and succeed (or precede) the second element in an ordering of elements.

In general, embodiments of the present disclosure relate to asset tracking. In one or more embodiments, asset tracking may be applied to mobile assets in the field related to construction, telecommunication, and natural resource exploration crews. In other embodiments, asset tracking may be used for tracking goods for sale in a retail business store. In yet other embodiments, asset tracking may be utilized to track specialized equipment. However, the present disclosure is not limited to these embodiments and the asset tracking may be applied to other situations. Further, the term "asset" is not limited to goods for sale, equipment, vehicles, etc. and extends to any item, person, or animal that is to be tracked.

FIG. 1 shows a block diagram of a master tracking device 100 in accordance with one or more embodiments. Specifically, in one or more embodiments, the master tracking device 100 may be mounted on a truck (not shown) and includes a main microcontroller 102, which is bidirectionally connected to a wireless radio communication modulator-demodulator (modem) 104, a global positioning system (GPS) modem 106, a satellite (SAT) modem 108, a cellular (Cell) modem 110, and an Ethernet modem 112. An Xbee™ modem is a commercial example of the wireless radio communication modem. The Ethernet modem 112 is bidirectionally connected to an Ethernet jack via an Ethernet cable 114. The wireless radio communication modem 104 in turn is connected bidirectionally to a wireless radio communication antenna 116, the GPS modem 106 is connected unidirectionally to a GPS antenna 118, the SAT modem 108 is bidirectionally connected to a SAT antenna 120, and the Cell modem 110 is bidirectionally connected to a Cell antenna 122. The four antennas together are integrated into an antenna, which is called a quad antenna (Quad ANT). The receiving and transmitting circuitry of the wireless radio communication modem 104 may also be referred to as wireless radio communication transceiver. Similarly, the receiving and transmitting circuitry of the SAT and Cell modems 108, 110 may also be referred to as SAT transceiver and Cell transceiver, respectively. The wireless radio communication transceiver communicates with radio frequency identification (RFID) tags in the field (not shown in FIG. 1) via RFID antenna 134. In one or more embodiments, the RFID tags and Mesh Tags (not shown in FIG. 1) in the field may form a mesh network and represent a local area network (LAN). In one or more embodiments, the SAT network, the Cell network and the Ethernet network represent a wide area networks (WAN) to which a server is connected (not shown in FIG. 1).

As illustrated in FIG. 1, the main microcontroller 102 is bidirectionally connected to a universal serial bus (USB) interface 124. The USB interface 124 may be used to connect a personal computer (PC) to the master tracking device 100. In addition, the main microcontroller 102 is bidirectionally connected to a secure digital (SD) card slot 126. The SD card slot 126 may be used to insert an SD card into the master tracking device 100. The main microcontroller 102 is further bidirectionally connected to an indicator LED and test switch panel 128. Specifically, the indicator LEDs are driven via outputs from the main microcontroller 102 while the test switch serves as an input to the main microcontroller 102.

The main microcontroller 102 is further bidirectionally connected to a signal conditioning circuit 130, which is responsible for signal conditioning, overvoltage protection, level shifting, and modem and sensor power control and conditioning. The signal conditioning circuit 130 is bidirectionally connected to an active radio frequency identification (RFID) reader 132. The RFID reader could communicate with RFID tags (not shown in FIG. 1) via RFID antenna 134. The signal conditioning circuit 130 is also bidirectionally connected to one or more sensors 136. The sensors 136 support the RS-485 standard and provide an output of 4-20 mA or 0-5V analog or a digital output. The sensors 136 are further powered at 3.3V, 6V, or 12V by signal conditioning 130. The signal condition circuit 130 is further bidirectionally connected to an engine control module (ECM) modem 138. The ECM modem 138, in turn is bidirectionally connected to the ECM 140 of the truck (not shown in FIG. 1) to which the master tracking device 100 is attached.

Electric power is provided to the master module 100 via the truck battery 142 or via an auxiliary electric input 144 which may be provided by a solar panel. Specifically, the truck battery 142 could have a voltage of 12V or 24V, while the solar/auxiliary input 144 could provide an electric input voltage in the range of 12-24V. The input voltage from the truck battery 142 and the truck ECM 140 are connected to an over- and under-voltage protection circuit 146. The electric voltage from the over- and under-voltage protection circuit 146 and the electric voltage from the solar/auxiliary input 144 are directed into a battery charger 148 and a 6V step down regulator 150.

The battery charger 148 provides electric charge to an internal 6V battery 152. An external 6V battery 154 may also be connected and may receive electric charge from the battery charger 148. The electric output voltage from the 6V step down regulator 150, the electric voltage from the internal 6V battery 152 and the electric voltage from the optional external 6V battery 154 are fed into a 6V system power selector circuit 154. The 6V system power selector circuit 154 in turn provides an electric voltage of 6V to the signal condition circuit 130 as well as to the main 3.3V voltage regulator 156. The main 3.3V voltage regulator 156 provides an input voltage of 3.3V to the signal conditioning circuit 130. This 3.3V voltage may be used by the signal conditioning circuit 130 to provide peripherals, e.g., sensors 136 with a 3.3V supply voltage. The main 3.3V voltage regulator 156 also provides the main microcontroller 102 with the supply voltage of 3.3V. The main microcontroller 102 is in a high power mode (HPM) or a low power mode (LPM) depending on whether the truck (not shown) to which the master module 100 is attached is switched on.

In the embodiment described in FIG. 1, the solar/auxiliary input 144, the truck battery 142, the truck ECM 140, the sensors 136, the RFID 134 antenna, the USB interface 124, the wireless radio communication antenna 116, the GPS antenna 118, the SAT antenna 120, the Cell antenna 122, the Ethernet cable 114, and the optional external 6V battery 154 are external to an enclosure of the master tracking device, while the other elements described above are internal to the enclosure of the master tracking device. Other embodiments may include a different configuration of internal elements and external elements of the master tracking device 100, without departing from the scope of the present disclosure.

While FIG. 1 shows a block diagram of a master tracking device 100 in accordance with one or more embodiments of the disclosure, other elements may be used in the block diagram without departing from the scope of the disclosure. For example, various elements may be combined to create a single element. As another example, the functionality performed by a single element may be performed by two or more components. In one or more embodiments, one or more of the elements shown in FIG. 1 may be omitted, repeated, and/or substituted. For example, although FIG. 1 shows a block diagram of a master tracking device 100 with a single embedded main microcontroller 102, one of ordinary skills in the art and having the benefit of this disclosure will recognize that any number of microcontrollers may be included in the master tracking device 100. Further, one of ordinary skills in the art will recognize that the main microcontroller 102 may include an internal or external time base.

In addition, one of ordinary skills in the art knows and appreciates that the main microcontroller 102 in FIG. 1 may contain a single or multiple processors. In one or more embodiments, the single processor or the multiple processors are hardware capable of executing sequence of instructions (e.g., that are stored in operatively connected memory) in order to perform operation on or otherwise manipulate data. In one or more embodiments, memory is any hardware configured to store data and/or instructions permanently and/or temporarily. Examples of memory include, but are not limited to, random access memory (RAM), cache memory, flash memory, erasable programmable read only memory (EPROM), or any other type of memory capable of storing data and/or instructions. In one or more embodiments, memory may include multiple different memory units and/or devices. The multiple different memory units and/or devices may or may not be of the same type, located at the same physical site, and/or co-located with one or more operatively connected processors.

In one or more embodiments, the master tracking device 100 includes hardware (e.g., circuitry), software, firmware, or any combination thereof, that includes functionality to perform at least some functions described herein in accordance with one or more embodiments of the disclosure. In one or more embodiments, the master tracking device 100 is, at least in part, a software application, or a portion thereof, written in any programming language that includes instructions stored on a non-transitory computer readable medium which, when executed by one or more processors in a computing device, enable the computing device to perform the functions described in accordance with one or more embodiments of the disclosure. In one or more embodiments, the firmware of the master tracking device 100 can be changed via the SD card slot 126, the USB interface 124, or via acquisition of the firmware data from the SAT, Cell, or Ethernet modems 108, 110, and 112.

In addition, various embodiments and modifications are described below. For example, while the disclosure has been described to include a wireless radio communication modem 104, a global positioning system (GPS) modem 106, a satellite (SAT) modem 108, a cellular (Cell) modem 110, and an Ethernet modem 112, other embodiments may include hardware to support other types of communication protocols. For example, in one or more embodiments, other wireless radio communication protocols may be used, of which ZigBee™ and RuBee™ are commercial examples. In other embodiments, the Ethernet jack to which the Ethernet cable 114 is connected, has access to the internet via a telephone line, a cable line, or a glassfiber. However, other embodiments may utilize alternate forms of communication.

In one or more embodiments, the electric power source to the master tracking device has been described as solar/auxiliary input 144 and as truck battery 142. Both electric power sources have been described as being 12V, 24V, or in the range of 12-24V. However, other embodiments may utilize other voltages or voltage ranges to provide electric power to the master tracking device 100. Further, in a different embodiment, the electric power to the master tracking device 100 may be provided from a power adaptor 110-220VAC to 24VDC, an electric generator, a fuel cell, or an uninterruptable power supply (UPS) with a lead acid, nickel cadmium, nickel metal hydride, or lithium ion battery. However, the disclosure is not limited to these embodiments and other electric power sources or voltage ranges may be used to provide electric power to the master tracking device 100. In addition, one or more embodiments have been described with a 6V system power selector circuit 154. In other embodiments, a different electric voltage may be used to supply electric voltage to the signal conditioning circuit 130 and the main voltage regulator 156 for the main microcontroller 102 and peripherals.

Furthermore, one or more embodiments have been described as a master tracking device ("master module") 100 with a wireless radio communication modem 104, a GPS modem 106, a SAT modem 108, a Cell modem 110, an Ethernet modem 112, an SD card slot 126, an RFID reader 132, sensors 136, and an ECM modem 138. While FIG. 1 shows a configuration of elements, other configurations may be used without departing from the scope of the disclosure. For example, various elements may be combined to create a single element. As another example, the functionality performed by a single element may be performed by two or more elements. In one or more embodiments, one or more of the elements shown in FIG. 1 may be omitted, repeated, and/or substituted.

Accordingly, for economic reasons, other embodiments may include a subset of the above referenced elements. For example, a "monitor module" may omit the active and passive RFID capability as well as the wireless radio communication modem 104. Similarly, a "single GPS module" may omit the ECM modem 138 and the active and passive RFID capability as well as the wireless radio communication modem 104. Other embodiments may a subset of other combinations of the above referenced elements. Yet further embodiments may include additional elements in a combination with all or a subset of the above referenced elements.

Figure 2:
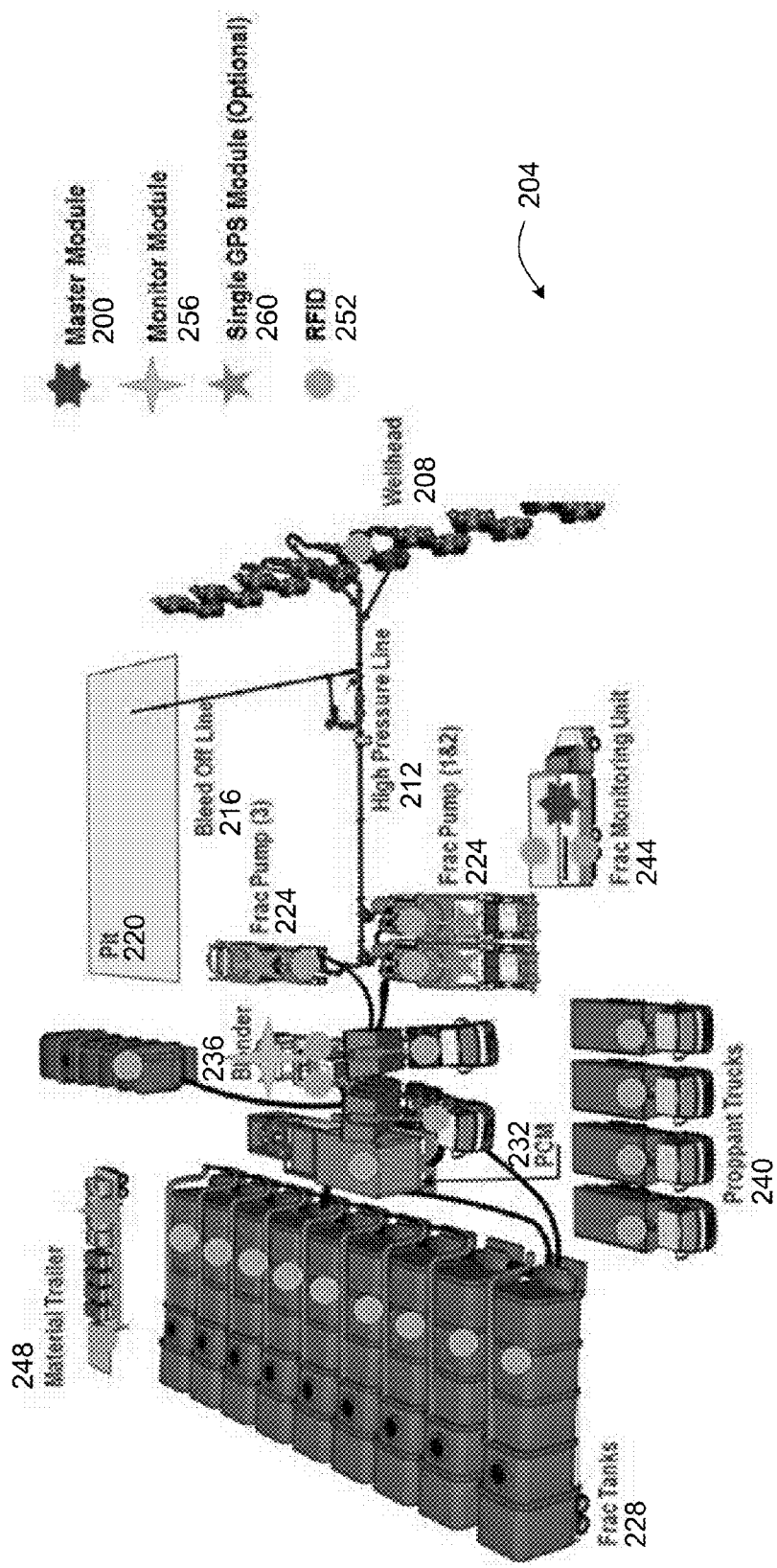
FIG. 2 shows an application of the master tracking device at a wellsite in accordance with one or more embodiments.

FIG. 2 illustrates the usage of the master tracking device (master module) 200 at a wellsite 204 in accordance with one or more embodiments. FIG. 2 shows a wellsite 204 with a wellhead 208 and a high pressure line 212. The high pressure line 212 is connected to a bleed off line 216 which in turn has an outlet into a pit 220. In FIG. 2, there are three fracking (Frac) pumps 224, each of which is installed on a truck. Multiple Frac tanks 228 are located at the wellsite 204 and provide fracturing fluid to the precision continuous mixer (PCM) 232 and the blender 236. Multiple proppant trucks 240 are also located at the wellsite 204 and provide the proppant to the blender 236. The blender 236 in turn supplies the fracturing fluid with the blended/mixed proppant to the Frac pumps 224. In addition, a Frac monitoring vehicle 244 and a material trailer 248 may also be at the wellsite 204.

In accordance with one or more embodiments, a master module 200 may be installed on the Frac monitoring vehicle 244. Further, two RFID tags 252 may also be located at the Frac monitoring vehicle 244. One of the RFID tags 252 may be permanently attached to the Frac monitoring vehicle 244, while the other RFID tag 252 may be attached to portable equipment in the Frac monitoring vehicle 244. In accordance with one or more embodiments, FIG. 2 illustrates that RFID tags 252 may also be located at the wellhead 208, the proppant trucks 240, the Frac tanks 228, the PCM 232, the Blender 236, and the Frac pumps 224. In addition, a monitor module 256 may be located at the Blender 236 and a single GPS module 260 may each be located at the material trailer 248 and the Frac pumps 224.

However, the above-described embodiments are not limited to usage at a wellsite 204. One of ordinary skill in the art would know and appreciate that the master tracking device 200 may be deployed for various other applications, e.g., large-scale construction sites, telecommunication service crews, railway repair crews, airports, shipyards, research laboratories, etc. Further, the arrangement of the master module 200, monitor module 256, single GPS module 260, and RFID tags 252 may be arranged in a different manner.

FIG. 3 shows an overview of the functionality of the master tracking device (master module) in accordance with one or more embodiments. In general, the master tracking device communicates with the RFID tags in the LAN and reports RFID tag location information, time stamp, truck emission information, etc. over the WAN to a server. The columns in FIG. 3 are labeled "Queue," "Event," "Message types," "HPM," "LPM," and "Allowed Channels." "Queue" refers to the importance or priority of an event. Further, the columns "HPM" and "LPM" are both divided into a column "Generated" and a column "Sent." Four queues are listed in FIG. 3, which, from in the order of highest priority to lowest priority are: over-the-air (OTA), high-priority queue (HPQ), medium-priority queue (MPQ), and low-priority queue (LPQ).

Within the OTA queue, an "OTA update" is an event which may have a message type of "checkupdates" or "fw_test." "Checkupdates" relates to checking on the WAN, whether a more recent firmware version than the installed firmware version is available. "fw_test" relates to identifying the currently installed firmware version. In the high power mode "HPM," the message types in the OTA queue are generated every 24 hours and sent immediately over the WAN to the server. In contrast, in the low power mode "LPM," the message types in the OTA queue are generated also every 24 hours, but sent over the WAN to the server in the next wake cycle. Further, within the OTA queue, the "Allowed Channels" are Ethernet and Cellular (Cell). Specifically, only if the Ethernet is not available, then the message type is sent via Cell over the WAN to the server.

Within the HPQ queue are the following events: "Daily update," "System status change," "Minimum child reporting," and "Alarms." The "Daily update" event within the HPQ queue has a message type "Daily Update GPS," which refers to the reporting of GPS location over the WAN to the server. In the HPM mode, the message "Daily Updates GPS" is generated every 12 hours and sent immediately, while in LPM mode, the message "Daily Updates GPS" is generated also every 12 hours, but sent in 30 minute slots. The "Allowed Channels" for the HPQ queue are in the priority order of Ethernet, Cell, and Satellite (SAT).

The "System status change" event within the HPQ queue has a message type "GPS+Status," which refers to the reporting of GPS location and the reporting of status change, i.e., external power change, over the WAN to the server. In the HPM mode, the message "GPS+Status" is generated upon an external (EXT) power change and sent immediately, while in LPM mode, the message "GPS+Status" is generated also upon the external power change, but sent in 30 minute slots.

The "Minimum child reporting" event within the HPQ queue has a message type "Mesh/RFID msg," which refers to the reporting of each RFID tag (child) over the WAN to the server. In the HPM mode, the message "Mesh/RFID msg" is generated every 24 hours for each child and sent immediately, while in LPM mode, the message "Mesh/RFID msg" is not generated. "Minimum child reporting," may be, for example, relate to reporting information on whether each child is still present.

The "Alarms" event within the HPQ queue has a message type "GPS+Alarm," which refers to the reporting of GPS location and the reporting of an alarm, i.e., an alarm which is triggered when a radioactive source is outside a defined radius of the wellsite, over the WAN to the server. In the HPM mode, the message "GPS+Alarm," if triggered, is generated every 24 hours per radioactive source and sent immediately, while in LPM mode, the message "GPS+Alarm," if triggered, is generated also every 24 hours per radioactive source, but sent in 30 minutes slots.

Within the MPQ queue are the following events: "Child detections," "System status change," and "Bread-crumb." The "Child detection" event within the MPQ queue has a message type "Mesh/RFID msg," which refers to the reporting of more extensive child information over the WAN to the server. In the HPM mode, the message "Mesh/RFID msg" is generated every hour per child and sent immediately, while in LPM mode, the message "Mesh/RFID msg" is not generated. The "Allowed Channels" for the MPQ queue are in the priority order of Ethernet and Cell.

The "System status change" event within the MPQ queue has a message type "GPS+Status," which refers to the reporting of GPS location and the reporting of other status changes than an external power change over the WAN to the server. In the HPM mode, the message "GPS+Status" is generated upon all other system status changes unrelated to an external power change and sent immediately, while in LPM mode, the message "GPS+Status" is generated also upon all other system status changes unrelated to an external power change, but sent in 30 minute slots.

The "Bread-crumb" event within the MPQ queue has a message type "Bread-crumb GPS," which refers to the reporting of GPS location in a defined interval over the WAN to the server. In the HPM mode, the message "Bread-crumb GPS" is generated when the GPS location varies by more than one kilometer with respect to an initial location and is sent immediately, while in LPM mode, the message "Bread-crumb GPS" is generated and sent at 30 minutes intervals when the GPS location varies by more than one kilometer with respect to an initial location.

Within the LPQ queue are the following events: "Alarms," "RA Inventory messages," and "ECM messages." The "Alarms" event within the LPQ queue has a message type "GPS+Alarm," which refers to the reporting of GPS location and the reporting of an alarm, i.e., an alarm which is triggered when a radioactive source is outside a defined radius of the wellsite, over the WAN to the server. In the HPM mode, the message "GPS+Alarm," if triggered, is generated every hour per radioactive source and sent immediately, while in LPM mode, the message "GPS+Alarm," if triggered, is generated also every hour per radioactive source, but not sent. The "Allowed Channels" for the LPQ queue are in the priority order of Ethernet and Cell.

The "RA Inventory messages" event within the LPQ queue has a message type "RA source msg," which refers to the reporting of information that the radioactive (RA) sources are inside a defined radius of the wellsite, over the WAN to the server. In the HPM mode, the message "RA source msg" is generated every 30 minutes and sent immediately, while in LPM mode, the message "RA source msg" is generated also every 30 minutes, but not sent.

The "ECM messages" event within the LPQ queue has a message type "ECM data msg," which refers to the reporting of information relating to the engine control module over the WAN to the server. For example, the information form the engine control module may contain emission information from the truck to which the master module is attached to. In the HPM mode, the message "ECM data msg" is generated every 2 minutes and sent immediately, while in LPM mode, the message "ECM data msg" is generated also every 2 minutes, but not sent.

However, the above-described embodiments are not limited to the particular priorities, events, or message types shown in FIG. 3. One of ordinary skills in the art would know and appreciate that other embodiments of the master tracking device may contain other functionalities, e.g., more than two power modes or a single power mode. Alternate embodiments may contain other events and different message types. Other embodiments may contain reporting of information that is customized to the particular deployment. Yet further embodiments may also include a time stamp when a message is generated and/or sent.

Figure 4A:
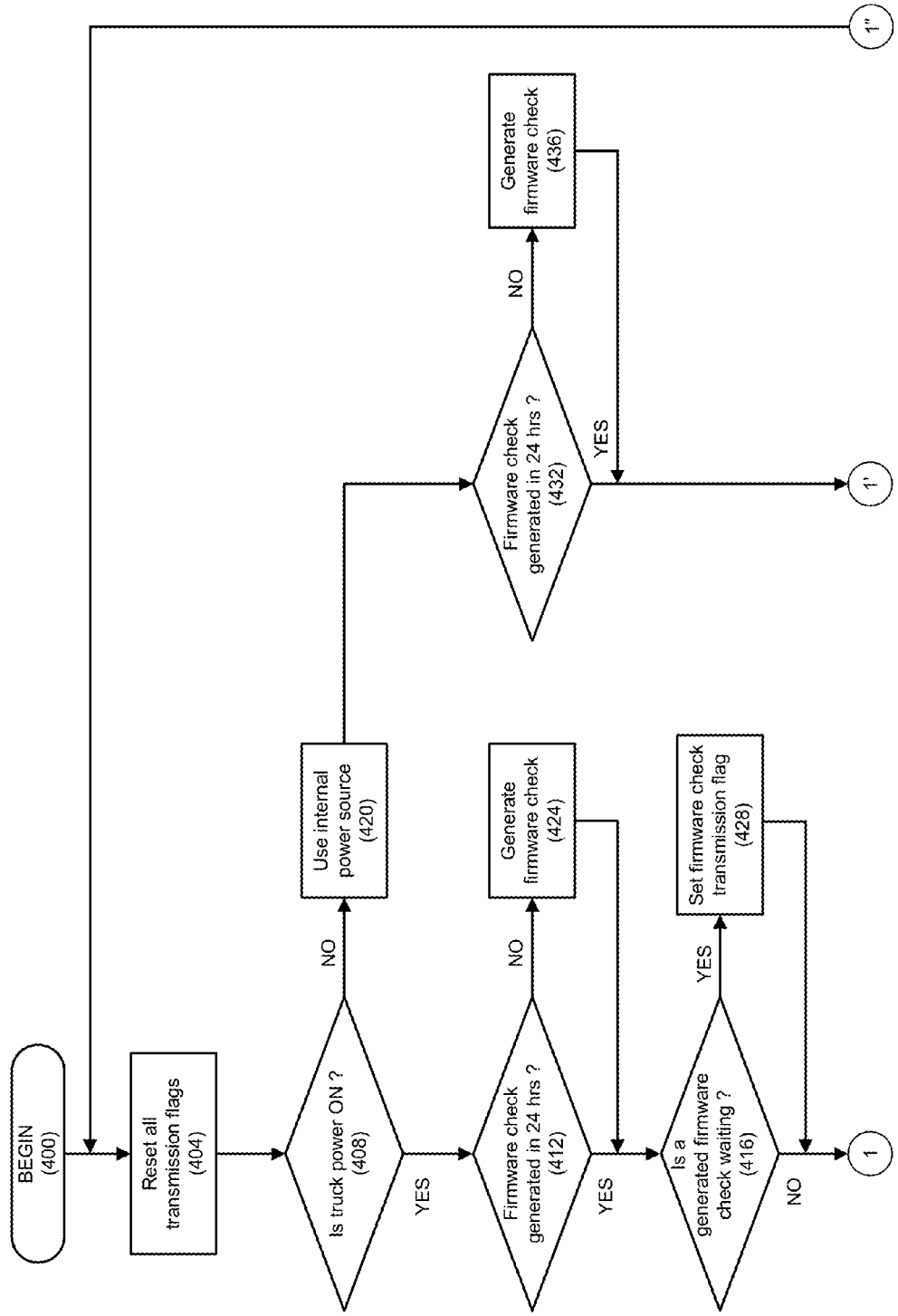
Figure 4C:
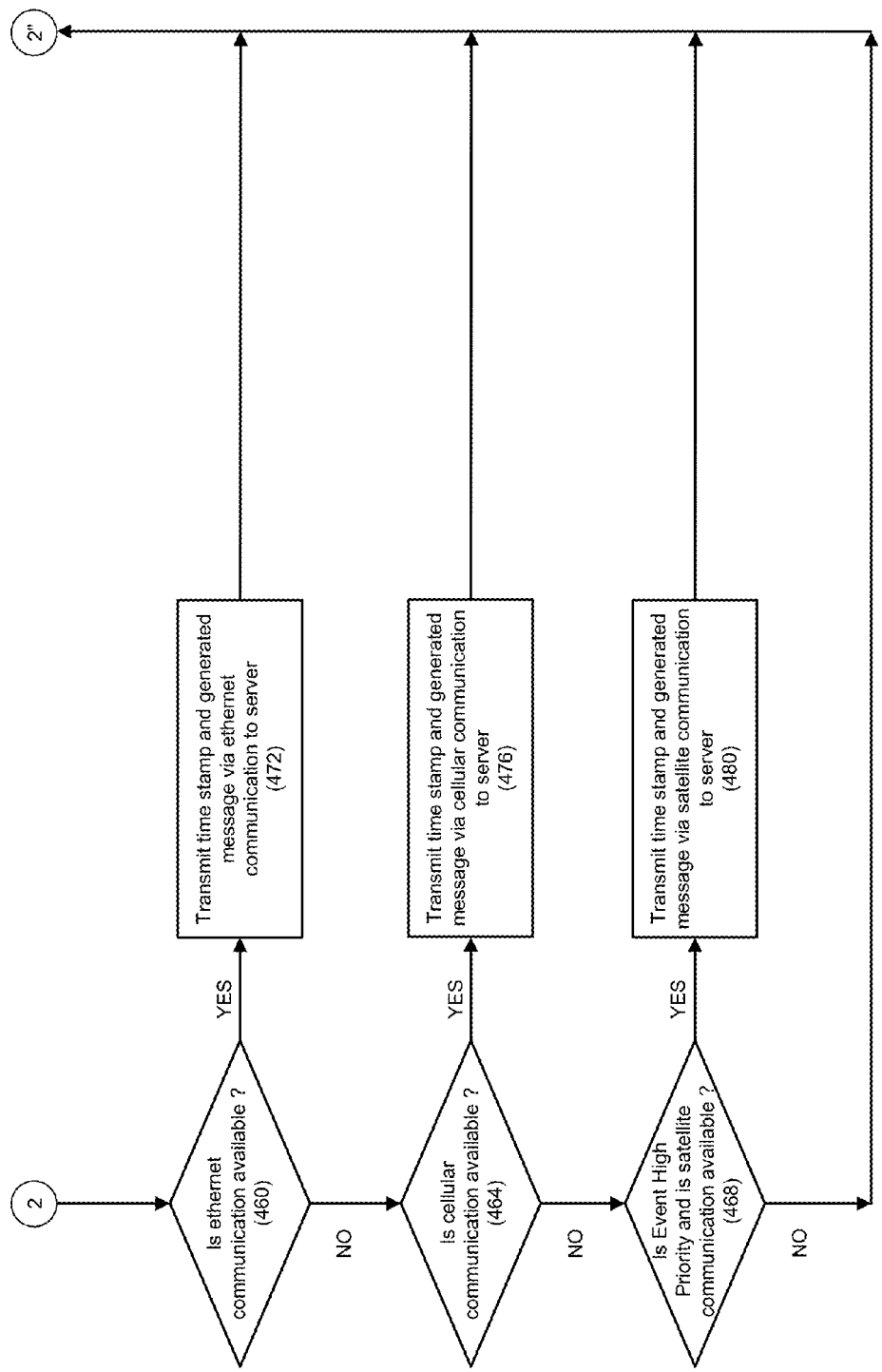

Referring to FIGS. 4a through 4c, a method of tracking assets using a master tracking device is illustrated using a flowchart in accordance with one or more embodiments. Specifically, the events "OTA update" and "Minimum child reporting" shown in FIG. 3 are described as examples of the method. The flowchart in FIG. 4a starts with "BEGIN" at 400. Next, the method resets all "transmission flags" at 404. A transmission flag may be a variable containing a number, e.g., "1," which indicates that specific information has been generated according to the columns "Generated" in FIG. 3. At 408, the method verifies whether the power of the truck to which the master module is attached is switched on. If the truck power is indeed switched on, the method proceeds to 412 in which it is verified, whether a firmware check has been generated in 24 hours. The firmware check at 412 may correspond to the message type "checkupdates" and the column "HPM" in FIG. 3. If a firmware check has not been generated in 24 hours, then the method proceeds to 424 in which a firmware check is generated. However, if it is determined at 412 that a firmware check has been generated in 24 hours, or a firmware check has been generated at 424, the method then proceeds to 416. At 416, it is verified whether a generated firmware check is already waiting. If a generated firmware check is indeed already waiting at 416, the method continues to 428 in which a firmware check transmission flag is set. Either, if a generated firmware check is not already waiting at 416 or a firmware check transmission flag is set at 428, the method continues to 440 in FIG. 4b.

At 440, the method verifies whether "Minimum child reporting" has been performed within 24 hours. The "Minimum child reporting" may correspond to the equivalent event in FIG. 3. If "Minimum child reporting" has been performed within 24 hours, the method continues to 444. If "Minimum child reporting" has not been performed within 24 hours, the method continues to 452 in which a "Mesh/RFID message" and a time stamp is generated. The "Mesh/RFID message" and time stamp may correspond to "Message Type" in FIG. 3. Next, the "Mesh/RFID message" may be generated after acquiring tag information from the RFID tags in the field. In addition, the RFID tags may communicate with each other in the LAN mesh network and transfer the tag information from an RFID tag, which is outside a range of communication of the master tracking device, to an RFID tag that is inside the range of communication of the master tracking device.

The method then continues to 444 in which it is verified whether a generated "Mesh/RFID message" is already waiting. If a "Mesh/RFID message" is not already waiting, then the method continues to 448. However, if a "Mesh/RFID message" is indeed already waiting, then a "Mesh/RFID message and time stamp" transmission flag is set at 456 before continuing to 448. At 448, the method verifies whether any transmission flag is set. If no transmission flag is set, the method returns to 404. For flowchart simplification purposes, all transmission flags in 404 are once again reset, although none of the transmission flags was set in this particular case.

If it is determined at 448 that no transmission flag is set, the method continues to 460 in FIG. 4c, in which it is verified whether Ethernet communication is available. If Ethernet communication is available, the method continues to 472 in which the time stamp and generated message is transmitted via Ethernet communication to the server. If no Ethernet communication is available at 460, the method continues to 464 in which the method verifies whether cellular communication is available. If cellular communication is available at 464, the method continues to 476 in which the time stamp and generated message is transmitted via cellular communication to the server. If no cellular communication is available at 464, the method continues to 468 in which the method verifies whether satellite communication is available. If satellite communication is available at 468, the method continues to 480 in which the time stamp and generated message is transmitted via satellite communication to the server. However, if no satellite communication is available at 468, the method continues to 404 in FIG. 4a. The verification in 460 through 468 regarding whether Ethernet, cellular, and satellite communications are available, may correspond to the column "Allowed Channels" and the high priority queue (HPQ) rows (Eth>Cell>Sat) in FIG. 3.

Referring again to 408 in FIG. 4a, if the method determines that the power of the truck to which the master module is attached to, is not switched on, the method then proceeds to 420 in which an internal power source is selected. After that, the method proceeds to 432 in which it is verified, whether a firmware check has been generated in 24 hours. The firmware check at 432 may correspond to the message type "checkupdates" and the column "LPM" in FIG. 3. If a firmware check has not been generated in 24 hours, then the method proceeds to 436 in which a firmware check is generated. If it is determined at 432 that a firmware check has been generated in 24 hours, or a firmware check has been generated at 436, the method then proceeds to 448 in FIG. 4b. With respect to "Minimum child reporting," 432 through 436 of the method contain no provision to generate a Mesh/RFID message, because according to FIG. 3 no Mesh/RFID message is to be generated in "LPM" mode. Regarding the generated firmware check at 436 of the method, FIG. 3 specifies in the "LPM" column that the generated firmware check is to be sent to the server upon the next wake cycle. The next wake cycle is encountered, when the method determines at 408 that the truck power is on. Subsequently, at 412 of the method, it is determined that a firmware check has already been generated (while the truck power was off) and the firmware check transmission flag is set at 428 of the method.

While FIGS. 4a, 4b and 4c show a flowchart, for example, events in FIG. 3 in accordance with one or more embodiments, one of ordinary skills in the art will appreciate that some or all of the elements in FIGS. 4a, 4b, and 4c may be executed in different orders, may be combined or omitted, and some of the elements may be executed in parallel. In addition, some elements have been omitted from the flowchart for illustration purposes. For example, the "Allowed Channels" column in FIG. 3 does not permit satellite communication for OTA, MPQ, and LPQ events. However, in other embodiments, the economic feasibility of the various communication channels may be different and consequently, FIG. 3 and the associated flowchart of the method in FIGS. 4a through 4c would be different as well. Yet in other embodiments, the flowchart is generically written to easily accommodate any changes in existing conditions with respect to FIG. 3, to accommodate new additional conditions, and to potentially remove no longer desired conditions. In further embodiments, FIG. 3 may be utilized as a text file input for the method of tracking assets using a master tracking device.

In addition, in one or more embodiments, the method of tracking assets using a master tracking device may further include acquiring a location information from a GPS receiver in accordance with, for example, the events "System status change," "Alarms," and "Bread-crumb" in FIG. 3. In alternate embodiments, GPS information may also be obtained from the RFID mesh network. One or more embodiments may acquire vehicular status information from the vehicle ECM in accordance with the event "ECM messages" of FIG. 3. In one or more embodiments, the vehicular status information may be related to emissions information and the vehicle may be the truck to which the master tracking device is attached. Furthermore, the method may include recharging and/or discharging of an internal power source.

Software instructions in the form of computer readable program code to perform embodiments may be stored, in whole or in part, temporarily or permanently, on a non-transitory computer readable medium. Such non-transitory computer readable medium may be an erasable and programmable read-only memory (EPROM), a flash memory, an internal or external storage device, a DVD, a CD, or any computer or embedded microcontroller readable storage medium. Specifically, the software instructions may correspond to computer readable program code or embedded microcontroller readable program code that when executed by a processor(s), is configured to perform embodiments of the disclosure. In addition, the software instructions and the associated non-transitory computer readable medium may also be referred to as firmware.

While the disclosure has been described with respect to a limited number of embodiments, those skilled in the art, having benefit of this disclosure, will appreciate that other embodiments can be devised, which do not depart from the scope of the disclosure as disclosed herein. Accordingly, the scope of the disclosure should be limited only by the attached claims.

What is claimed is:

1. A master tracking device, comprising:
   a first transceiver for a local area network (LAN) configured to acquire a tag information from a plurality of radio frequency identification (RFID) tags;
   a global positioning system (GPS) receiver configured to acquire a location information;
   a microcontroller;
   a time base;
   an interface for an engine control module (ECM) configured to acquire a vehicular status information; and
   a second transceiver for a wide area network (WAN) configured to transmit a time stamp and the acquired tag, location, and vehicular status information to a server.

2. The master tracking device according to claim 1, further comprising:
   an internal rechargeable power source.

3. The master tracking device according to claim 1, further comprising:
   a third and a fourth transceiver for the WAN configured to transmit the time stamp and the acquired tag, location, and vehicular status information to the server.

4. The master tracking device according to claim 1, wherein
   the LAN is a local area mesh network and the RFID tags are active RFID tags.

5. The master tracking device according to claim 1, wherein
the second transceiver for the WAN is connected to an ethernet.

6. The master tracking device according to claim 3, wherein
   the third transceiver for the WAN is a cellular transceiver.

7. The master tracking device according to claim 3, wherein
   the fourth transceiver for the WAN is a satellite transceiver.

8. The master tracking device according to claim 1, wherein the master tracking device is mounted on a vehicle.

9. The master tracking device according to claim 1, wherein the master tracking device has a plurality of power modes.

10. A method of tracking assets using a master tracking device, comprising:
    acquiring tag information from a plurality of radio frequency identification (RFID) tags in a local area network (LAN);
    acquiring a location information from a global positioning system (GPS) receiver;
    acquiring a vehicular status information from an engine control module (ECM); and
    transmitting a time stamp and the acquired information to a server in a wide area network (WAN).

11. The method according to claim 10, further comprising:
    recharging/discharging an internal power source.

12. The method according to claim 10, further comprising:
    determining whether an ethernet communication type, a cellular communication type, and a satellite communication type are available.

13. The method according to claim 12, further comprising determining the most economical communication type from the ethernet communication type, the cellular communication type, and the satellite communication type, and wherein the time stamp and the transmitted tag, location, and vehicular status information is transmitted to the server according to the determined most economical communication type which is available.

14. The method according to claim 10, further comprising:
    determining whether an external power supply is switched on or off, and when it is determined that the external power supply is switched off, switching the power supply from the external power supply to an internal power source.

15. The method according to claim 14, wherein when the external power supply is switched off, the master tracking device toggles from a first power state to a second power state.

16. The method according to claim 10, wherein the RFID tags in a LAN communicate with each other and transfer the tag information from an a first RFID tag, which is outside a range of communication of the master tracking device, to a second RFID tag that is inside the range of communication of the master tracking device.

17. The method according to claim 10, wherein a frequency of acquiring the tag, location, and vehicular status information depends on a power state of the master tracking device.

18. The method according to claim 10, wherein a timing of transmitting the acquired tag, location, and vehicular status information to the server depends on a power state of the master tracking device.

19. The method according to claim 10, wherein a priority of transmitting the acquired tag, location, and vehicular status information to the server depends on a power state of the master tracking device.

20. A non-transitory computer readable medium comprising instructions which, when executed by a processor, cause the processor to:
- acquire tag information from a plurality of radio frequency identification (RFID) tags in a local area network (LAN);
- acquire a location information from a global positioning system (GPS) receiver;
- acquire a vehicular status information from an engine control module (ECM); and
- transmit a time stamp and the acquired tag, location, and vehicular status information to a server in a wide area network (WAN).

* * * * *